(12) United States Patent
Savolainen et al.

(10) Patent No.: US 11,206,533 B2
(45) Date of Patent: Dec. 21, 2021

(54) TOKEN BASED AUTHENTICATION

(71) Applicant: Nokia Technologies Oy, Espoo (FI)

(72) Inventors: Teemu Ilmari Savolainen, Nokia (FI);
Jyri Hämäläinen, Helsinki (FI);
Markus Isomäki, Espoo (FI); István Beszteri, Espoo (FI)

(73) Assignee: Nokia Technologies Oy, Espoo (FI)

( * ) Notice: Subject to any disclaimer, the term of this patent is extended or adjusted under 35 U.S.C. 154(b) by 403 days.

(21) Appl. No.: 15/742,482

(22) PCT Filed: Jul. 9, 2015

(86) PCT No.: PCT/FI2015/050496
§ 371 (c)(1),
(2) Date: Jan. 5, 2018

(87) PCT Pub. No.: WO2017/005961
PCT Pub. Date: Jan. 12, 2017

(65) Prior Publication Data
US 2018/0205545 A1    Jul. 19, 2018

(51) Int. Cl.
*H04L 29/06* (2006.01)
*H04W 12/06* (2021.01)
(Continued)

(52) U.S. Cl.
CPC ........... *H04W 12/06* (2013.01); *G06F 21/35* (2013.01); *G06F 21/42* (2013.01); *H04L 9/3213* (2013.01);
(Continued)

(58) Field of Classification Search
CPC ....... H04L 9/3213; H04L 29/06; H04L 63/08; H04L 63/0807; H04L 9/3239;
(Continued)

(56) References Cited

U.S. PATENT DOCUMENTS 6,192,349 B1 * 2/2001 Husemann ............ G06K 17/00
705/65
7,178,025 B2 * 2/2007 Scheidt ................. G06F 21/31
705/67
(Continued)

FOREIGN PATENT DOCUMENTS

CN    101145913 A    3/2008
CN    101179380 A    5/2008
(Continued)

OTHER PUBLICATIONS

Shirvanian et al., "Two-factor Authentication Resilient to Server Compromise Using Mix-bandwidth Devices", NDSS Symposium, Feb. 2014, pp. 1-16.
(Continued)

*Primary Examiner* — Kevin Bechtel
*Assistant Examiner* — Hany S. Gadalla
(74) *Attorney, Agent, or Firm* — Laine IP Oy

(57) ABSTRACT

According to an example aspect of the present invention, there is provided an apparatus comprising a memory configured to store a first token and a second token, and at least one processing core configured to obtain a first value based at least in part on the first token and the second token, and to cause the apparatus to participate in a security procedure, based at least in part on the first hash, with a second apparatus.

12 Claims, 7 Drawing Sheets

(51) Int. Cl.
*G06F 21/35* (2013.01)
*G06F 21/42* (2013.01)
*H04L 9/32* (2006.01)

(52) U.S. Cl.
CPC ............ *H04L 9/3239* (2013.01); *H04L 29/06* (2013.01); *H04L 63/08* (2013.01); *H04L 63/0807* (2013.01); *H04L 63/06* (2013.01); *H04L 63/0869* (2013.01); *H04L 2209/805* (2013.01); *H04L 2463/082* (2013.01)

(58) Field of Classification Search
CPC ................ H04L 63/06; H04L 63/0869; H04L 2463/082; H04L 2209/805; G06F 21/42; G06F 21/35; H04W 12/06; H04W 12/04
See application file for complete search history.

(56) References Cited

U.S. PATENT DOCUMENTS

| | | | | |
|---|---|---|---|---|
| 7,814,538 | B2* | 10/2010 | Kuehnel | H04L 9/3236 726/10 |
| 8,272,038 | B2 | 9/2012 | Husemann et al. | |
| 8,924,712 | B2 | 12/2014 | Varadarajan et al. | |
| 9,438,418 | B1* | 9/2016 | Pedersen | H04L 9/0861 |
| 9,686,676 | B2 | 6/2017 | Palin et al. | |
| 2004/0006693 | A1* | 1/2004 | Vasnani | H04L 63/0876 713/168 |
| 2005/0076217 | A1 | 4/2005 | Lord et al. | |
| 2005/0169464 | A1* | 8/2005 | Sannino | H04L 9/3073 380/30 |
| 2007/0279227 | A1* | 12/2007 | Juels | H04L 63/08 340/572.1 |
| 2010/0100721 | A1* | 4/2010 | Su | G06F 11/1456 713/150 |
| 2011/0219427 | A1 | 9/2011 | Hito et al. | |
| 2012/0045057 | A1* | 2/2012 | Brown | H04L 9/3236 380/255 |
| 2012/0238216 | A1 | 9/2012 | Hallowell et al. | |
| 2013/0173759 | A1* | 7/2013 | Herse | H04W 12/0608 709/219 |
| 2014/0115340 | A1* | 4/2014 | Lee | H04L 9/3271 713/182 |
| 2014/0189841 | A1 | 7/2014 | Metke et al. | |
| 2014/0236837 | A1* | 8/2014 | Drake | G06F 3/1423 705/71 |
| 2015/0350197 | A1* | 12/2015 | Ike | H04L 63/126 713/156 |
| 2016/0182231 | A1* | 6/2016 | Fontecchio | H04L 9/3239 713/172 |
| 2016/0212194 | A1 | 7/2016 | Palin et al. | |
| 2017/0070497 | A1* | 3/2017 | McCallum | H04L 9/3236 |
| 2017/0187524 | A1* | 6/2017 | Furukawa | H04L 63/0428 |

FOREIGN PATENT DOCUMENTS

| | | |
|---|---|---|
| CN | 103262466 A | 8/2013 |
| CN | 103731272 A | 4/2014 |
| CN | 104412536 A | 3/2015 |
| EP | 1865656 | 12/2007 |
| EP | 2747362 | 6/2014 |
| EP | 2852122 | 3/2015 |
| WO | 2014005004 | 1/2014 |

OTHER PUBLICATIONS

"HID Trusted Tag™ Services Offers Internet of Things (IoT) Authentication For Smart Mobile Devices", HID Global, Retrieved on Feb. 21, 2019, Webpage available at: https://www.hidglobal.com/press-releases/hid-trusted-tagtm-services-offers-internet-things-iot-authentication-smart-mobile.

Sarvabhatla et al., "A Secure and Light Weight Authentication Protocol for Wireless Sensor Network in Internet of Things", IIIT Delhi, 2015, 2 pages.

Extended European Search Report received for corresponding European No. 15897614.2, dated Feb. 14, 2019, 9 pages.

Balfanz et al., "Talking To Strangers: Authentication in Ad-Hoc Wireless Networks", NDSS Symposium, 2002, 13 pages.

International Search Report received for corresponding Patent Cooperation Treaty Application No. PCT/FI2015/050496, dated Oct. 29, 2015, 10 pages.

Suomalainen, Jani "Smartphone assisted security pairings for the Internet of Things", 4th International Conference on Wireless Communications, Vehicular Technology, Information Theory and Aerospace Electronic Systems (VITAE) May 2014.

* cited by examiner

TOKEN BASED AUTHENTICATION

RELATED APPLICATION

This application was originally filed as PCT Application No. PCT/FI2015/050496 filed Jul. 9, 2015.

FIELD

The present invention relates to authentication, in particular token-based authentication.

BACKGROUND

Authentication involves providing assurances of identity or authorization to a party, in order to access resources controlled by that party. For example, in order to access an internet banking system, a user must authenticate himself, to prove his identity and that he is the client. Requiring authentication prior to substantial access thus prevents unauthorized parties from accessing the client's savings.

Authentication may also be employed in granting a device access to services provided by another device. For example, a cellular telephone may be required to authenticate itself to a cellular network, before the cellular telephone is allowed to place or receive telephone calls over the network. Such authentication may be based, at least in part, on a secret stored on the cellular telephone, for example in a subscriber identity module, SIM.

Authentication of a cellular telephone to a network may take place between the SIM and an authentication server disposed in the network. Messages may be relayed to the authentication server via a base station and at least one core network node, for example.

When authentication is based on a single element, such as a password, the authentication method may become compromised when the single element is stolen. To overcome such single-factor vulnerability, multi-factor authentication may be employed. An example of multi-factor authentication is two-factor authentication, where two elements are used in authentication. Authentication is successful only if both elements are correctly present in two-factor authentication. More generally, in multi-factor authentication, authentication is successful only if each of the required multiple elements are correctly present in the multi-factor authentication.

An example of two-factor authentication is a chip and pin authentication used in credit card cash withdrawal. Access to the credit account associated with the credit card is only granted if the user can produce both the card, which comprises a chip, and the pin code associated with the card. The card without the pin code, or the pin code without the card, is not sufficient to access the credit account.

SUMMARY OF THE INVENTION

The invention is defined by the features of the independent claims. Some specific embodiments are defined in the dependent claims.

According to a first aspect of the present invention, there is provided an apparatus comprising a memory configured to store a first token and a second token, and at least one processing core configured to obtain a first hash value based at least in part on the first token and the second token, and to cause the apparatus to participate in a security procedure, based at least in part on the first hash, with a second apparatus.

Various embodiments of the first aspect may comprise at least one feature from the following bulleted list:
  the at least one processing core is configured to cause a transmitter comprised in the apparatus to cause transmission of the first token and the first hash to the second apparatus
  the at least one processing core is configured to obtain the second token from a short-range apparatus
  the short-range apparatus comprises a radio-frequency tag
  the at least one processing core is configured to obtain the first token from the second apparatus
  the at least one processing core is configured to obtain, from a server, a second hash, the second hash being based on the first token and a third token, and wherein the at least one processing core is configured to obtain the first hash based at least in part on the first token by obtaining the first hash based at least in part on the second hash
  the at least one processing core is configured to cause provision of the first token to the server
  the apparatus is configured to receive, from the second apparatus, a third hash, a fourth hash and a fourth token, to obtain a fourth hash based at least in part on the second token and the fourth token, and to provide the third hash and the fourth hash to the server
  the security procedure comprises an authentication procedure, which comprises the apparatus transmitting the first hash to the second apparatus
  the security procedure comprises an encryption procedure, which comprises the apparatus transmitting to the second apparatus information that the apparatus has encrypted using the first hash or a key derived from the first hash as an encryption key.

According to a second aspect of the present invention, there is provided an apparatus comprising at least one processing core, at least one memory including computer program code, the at least one memory and the computer program code being configured to, with the at least one processing core, cause the apparatus at least to exchange a first token with a first apparatus, obtain a first hash based at least in part on the first token and a second token, wherein the first hash is obtained in the apparatus based at least in part on the first token by obtaining the first hash based at least in part on a second hash, the second hash being obtained based on the first token and a third token, and participate in a security procedure, based at least in part on the first hash, with the first apparatus.

Various embodiments of the second aspect may comprise at least one feature from the following bulleted list:
  the security procedure comprises an authentication procedure, which comprises the apparatus receiving a hash from the first apparatus and verifying, whether the received hash is the same as the first hash
  the security procedure comprises an encryption procedure, which comprises the apparatus transmitting to the first apparatus information that the apparatus has encrypted using the first hash a key derived from the first hash as an encryption key.

According to a third aspect of the present invention, there is provided a method comprising storing a first token and a second token, obtaining a first hash value based at least in part on the first token and the second token, and causing an apparatus to participate in a security procedure, based at least in part on the first hash, with a second apparatus.

Various embodiments of the third aspect may comprise at least one feature corresponding to a feature from the preceding bulleted list laid out in connection with the first aspect.

According to a fourth aspect of the present invention, there is provided a method, comprising exchanging a first token with a first apparatus, obtaining a first hash based at least in part on the first token and a second token, wherein the first hash is obtained in an apparatus based at least in part on the first token by obtaining the first hash based at least in part on a second hash, the second hash being obtained based on the first token and a third token, and participating in a security procedure, based at least in part on the first hash, with the first apparatus.

Various embodiments of the fourth aspect may comprise at least one feature corresponding to a feature from the preceding bulleted list laid out in connection with the second aspect.

According to a fifth aspect of the present invention, there is provided an apparatus comprising means for storing a first token and a second token, means for obtaining a first hash value based at least in part on the first token and the second token, and means for causing an apparatus to participate in a security procedure, based at least in part on the first hash, with a second apparatus.

According to a sixth aspect of the present invention, there is provided an apparatus, comprising means for exchanging a first token with a first apparatus, means for obtaining a first hash based at least in part on the first token and a second token, wherein the first hash is obtained in the apparatus based at least in part on the first token by obtaining the first hash based at least in part on a second hash, the second hash being obtained based on the first token and a third token, and means for participating in a security procedure, based at least in part on the first hash, with the first apparatus.

According to a seventh aspect of the present invention, there is provided a non-transitory computer readable medium having stored thereon a set of computer readable instructions that, when executed by at least one processor, cause an apparatus to at least store a first token and a second token, obtain a first hash value based at least in part on the first token and the second token, and cause an apparatus to participate in a security procedure, based at least in part on the first hash, with a second apparatus.

According to an eighth aspect of the present invention, there is provided a non-transitory computer readable medium having stored thereon a set of computer readable instructions that, when executed by at least one processor, cause an apparatus to at least exchange a first token with a first apparatus, obtain a first hash based at least in part on the first token and a second token, wherein the first hash is obtained in an apparatus based at least in part on the first token by obtaining the first hash based at least in part on a second hash, the second hash being obtained based on the first token and a third token, and participate in a security procedure, based at least in part on the first hash, with the first apparatus.

According to a ninth aspect of the present invention, there is provided a computer program configured to cause a method in accordance with at least one of the third and fourth aspects to be performed.

EMBODIMENTS

By performing authentication or encryption based on a hash that is itself based on another hash, a multi-factor authentication solution may be employed that avoids exposing all authentication elements to a single party which may be unreliable. Thus, for example, a device, a cloud server and a local tag may collaborate to provide the tokens needed to produce the correct resulting hash, in such a way that no individual outside party knows all the tokens.

Figure 1:
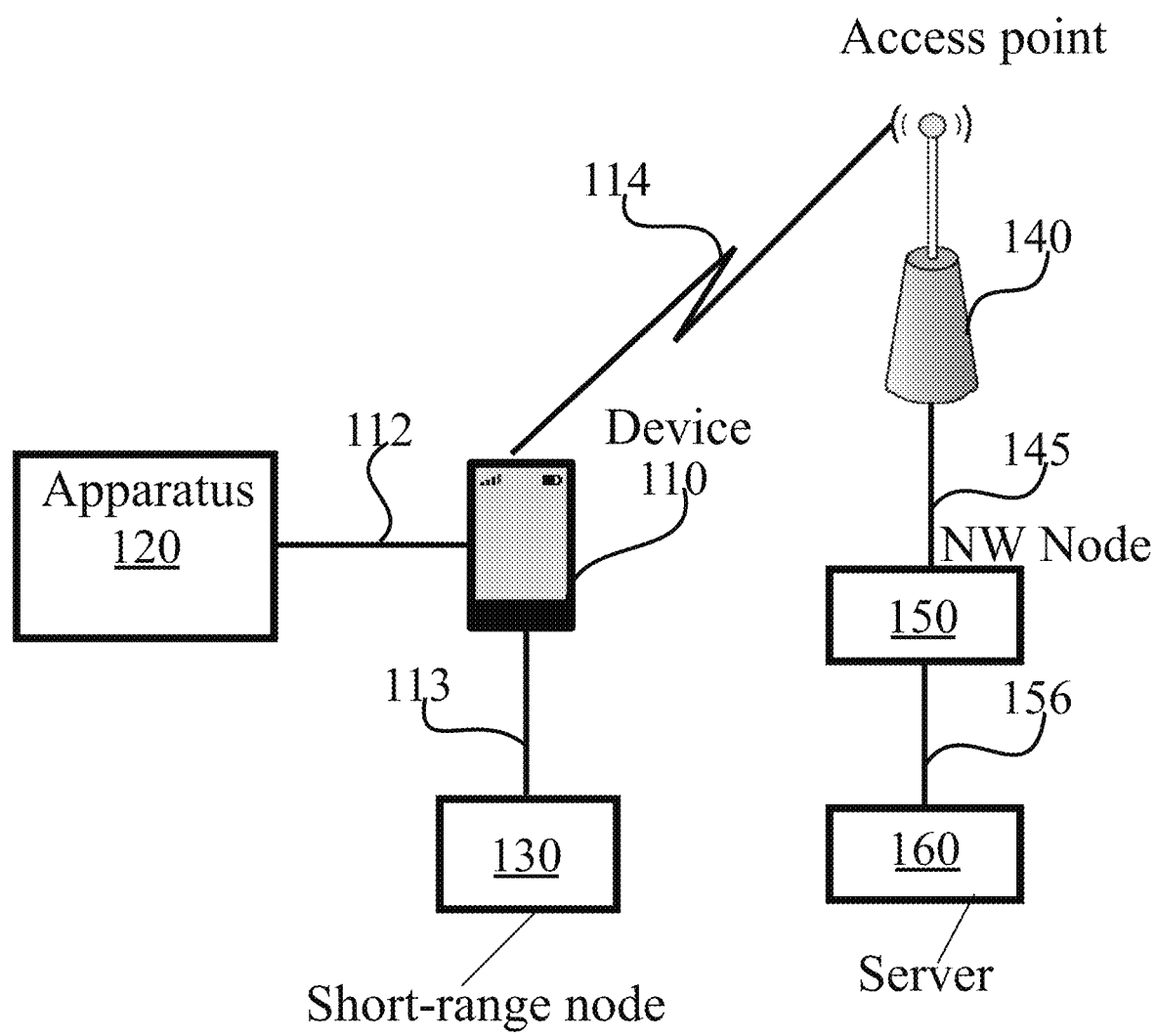
FIG. 1 illustrates an example system in accordance with at least some embodiments of the present invention.

FIG. 1 illustrates an example system in accordance with at least some embodiments of the present invention. The system comprises device 110, which may comprise, for example, a tablet computer, smartphone, phablet, laptop computer, desktop computer, smart watch or indeed another type of suitable device. Device 110 may run a Windows phone, Android or Linux operating system, for example.

Apparatus 120 may comprise, for example, a digital television, a data storage service, a home automation controller or another kind of suitable device, such as, for example, a door lock, an industrial machine, a computer or a medical device. Apparatus 120 may comprise an Internet of Things, IoT, device which can receive communications, for example based on an internet protocol version 6, IPv6, or version 4, IPv4, addressing scheme. Apparatus 120 may in general comprise an apparatus that device 110 may wish to use or access in some way. Apparatus 120 may be access restricted in the sense that not all devices will be granted access thereto.

Device 110 has a connection 112 with apparatus 120. Connection 112 may comprise a wireless connection, such as for example a short-range wireless connection, such as a Bluetooth, Bluetooth LE or Wibree connection, for example. Connection 112 may comprise an optical connection, and/or a wire-line connection. A connection that is both optical and wire-line may comprise a fibre optic connection, for example.

Apparatus 120 may require device 110 to perform an authentication process with apparatus 120 prior to allowing device 110 to access data or services of apparatus 120. For example, where device 110 and apparatus 120 have a shared secret in the form of a second token, device 110 may generate a first token and compute a hash over the first token and the second token. Device 110 may obtain the second token, for example, from a display or sticker associated with apparatus 120. Alternatively, device 110 may obtain the second token from short-range node 130, which will be described below. Device 110 can then provide the first token and the hash to apparatus 120, so that apparatus can compute the hash using the first token and the second token. This way, the shared secret, that is, the second token, is not communicated between device 110 and apparatus 120.

In general, computing a hash may comprise obtaining a hash value, such that input data is provided to a hash algorithm, such as, for example, a cryptographic hash algorithm, and the hash value is obtained as an output of the hash algorithm. A hash value may be referred to as a hash for the sake of simplicity. Examples of cryptographic hash algorithms include MD5, SHA-256 and SHA-3. A cryptographic hash algorithm may be considered to be a hash algorithm which is very difficult to revert, that is, to obtain the input from the hash value produced by the algorithm. In general, in at least some embodiments of the present invention, cryptographic hash algorithms are used to obtain hash values since they provide more secure authentication.

Where device 110 does not have the second token to begin with, device 110 may be configured to obtain the second token from another node, such as, for example, short-range node 130. Short-range node 130 may comprise a near-field communication, NFC, tag or a radio-frequency identification, RFID, tag, for example. A further example is a quick response, QR, code tag. Short-range node 130 may be disposed close to apparatus 120, so that device seeking to access apparatus 120 would need to be close to apparatus 120 in order to be able to obtain the second token from short-range node 130. Alternatively, short-range node 130 may be carried by a user, for example in a keychain. Interface 113 between device 110 and short-range node 130 may take a suitable form, for example, where short-range node 130 is an NFC tag, interface 113 may be arranged in accordance with NFC technology.

Device 110 and apparatus 120 may be configured to exchange the first token, which may be referred to as a dynamic token, between themselves. For example, device 110 may request for the first token from apparatus 120, responsive to which apparatus 120 may generate the first token and provide a copy of it to device 110. Alternatively, device 110 may generate the first token and provide a copy of it to apparatus 120 in connection with the authentication procedure. Whether in device 110 or in apparatus 120, the first token may be generated based at least in part on a random or pseudo-random process.

Device 110 may obtain from short-range node 130 the second token, and provide to apparatus 120 a hash obtained from the first token and the second token. The second token may be a static token. The hash derived by device 110 may be referred to as the first hash. Alternatively to directly using the first token to derive the first hash, device 110 may provide a copy of the first token to server 160. Device 110 may use a wireless link 114 with an access point 140 to communicate with the server. Messages exchanged between device 110 and server 160 may further traverse, along the way, a network node 150, which may comprise a gateway, for example. Connection 156 between network node 150 and server 160 may traverse at least one network. Connection 145 between access point 140 and network node 150 may comprise a wire-line connection, for example. In some embodiments, network node 150 is absent. Access point 140 may comprise a cellular or non-cellular access point, for example. A cellular access point may be referred to terminologically as a base station. Server 160 and apparatus 120 may both store a third token, which may comprise a static token, for example.

As a response to receiving, from device 110, a copy of the first token, server 160 may obtain a hash from the first token and the third token, in other words by providing the first token and the third token as input to the hash function. This hash may be referred to as the second hash. Server 160 may provide the second hash to device 110, for example via network node 150 and access point 140. At least in some embodiments, server 160 runs a check as to whether device 110 should be enabled to access apparatus 120. Such a check may comprise checking whether an identity of device 110 is comprised in a list of identities of devices to which access to apparatus 120 has been allowed. Alternatively, server 160 may check whether device 110 is associated with a subscription type that is associated with access to apparatus 120.

Device 110 may thus be provided with the second hash, which is based on the first token and the third token, even though device 110 doesn't know the third token. Device 110 may then derive the first hash, using as input the second hash and the second token, which, as described above, may be obtained, for example, from short-range node 130. The first hash is here again a term used to refer to the hash derived in device 110, the first hash being based, directly or indirectly, on the first token. Where the first hash is based indirectly on the first token, it may thus also be based, indirectly, on the third token.

The first hash, therefore, is based directly on the second token and indirectly, via the second hash, on the first token and the third token. Device 110 need not know the third token, which provides the advantage that server 160 is needed to access apparatus 120 even if device 110 acts maliciously and attempts to provide its access to a further device. Similarly, server 160 doesn't know the second token, which means the server cannot on its own, for example if it is hacked, provide access to unauthorized devices.

Device 110 may participate in a security procedure with apparatus 120 based, at least in part, on the first hash. For example, to authenticate itself, device 110 may provide the first hash to apparatus 120. The providing of the first hash to apparatus 120 may occur using Bluetooth, BT, low-energy, LE, generic attribute profile, GATT, CoAP, HTTP, MQTT, IP, for example. BT LE GATT may use specified service/characteristics, for example. Since apparatus 120 knows the first, second and third tokens, it can derive first the second hash, and then the first hash, to verify if the hash provided by device 110 is really based on the first, second and third tokens. If this is the case, apparatus 120 may allow device 110 access. Any connection between apparatus 120 and device 110 may be encrypted after authentication, or even since before authentication, for example based on a diffie-hellman exchange, or another secured protocol such as https.

Alternatively or additionally to providing the first hash to apparatus 120 for comparison, device 110 can participate in an encrypted communication with apparatus 120, such that the first hash is either used as an encryption key, or the encryption key is derived from the first hash, or from the second hash, or from first or second tokens, or combinations thereof.

In some embodiments, a further token is used, which is referred to herein as a fourth token. The fourth token may be selected by apparatus 120, whereafter apparatus 120 may derive a third hash based on the third token and a fourth hash, the fourth hash being derived in apparatus 120 based on the second token and the fourth token. The third hash, the fourth token and the fourth hash may be provided from apparatus 120 to device 110. Device 110 may then also calculate the fourth hash based on the second token and the fourth token, and provide to server 160 the third hash and the fourth hash. Server 160 can then separately derive the third hash using the fourth hash and the third token, to verify apparatus 120 is who it claims to be.

An application, such as, for example, a HTML5 or Java application, may be downloaded to device 110, such that the application is configured to provide a user interface to enable a user of device 110 to control, at least in part, apparatus 120 and/or a service thereof when access has been granted following successful authentication. Where the authentication process is handled in device 110 outside of the application, the application can remain ignorant of the tokens involved in the authentication procedure. Therefore, as an advantage even a malicious application cannot compromise the tokens or hashes, since it doesn't know what they are.

Figure 2:
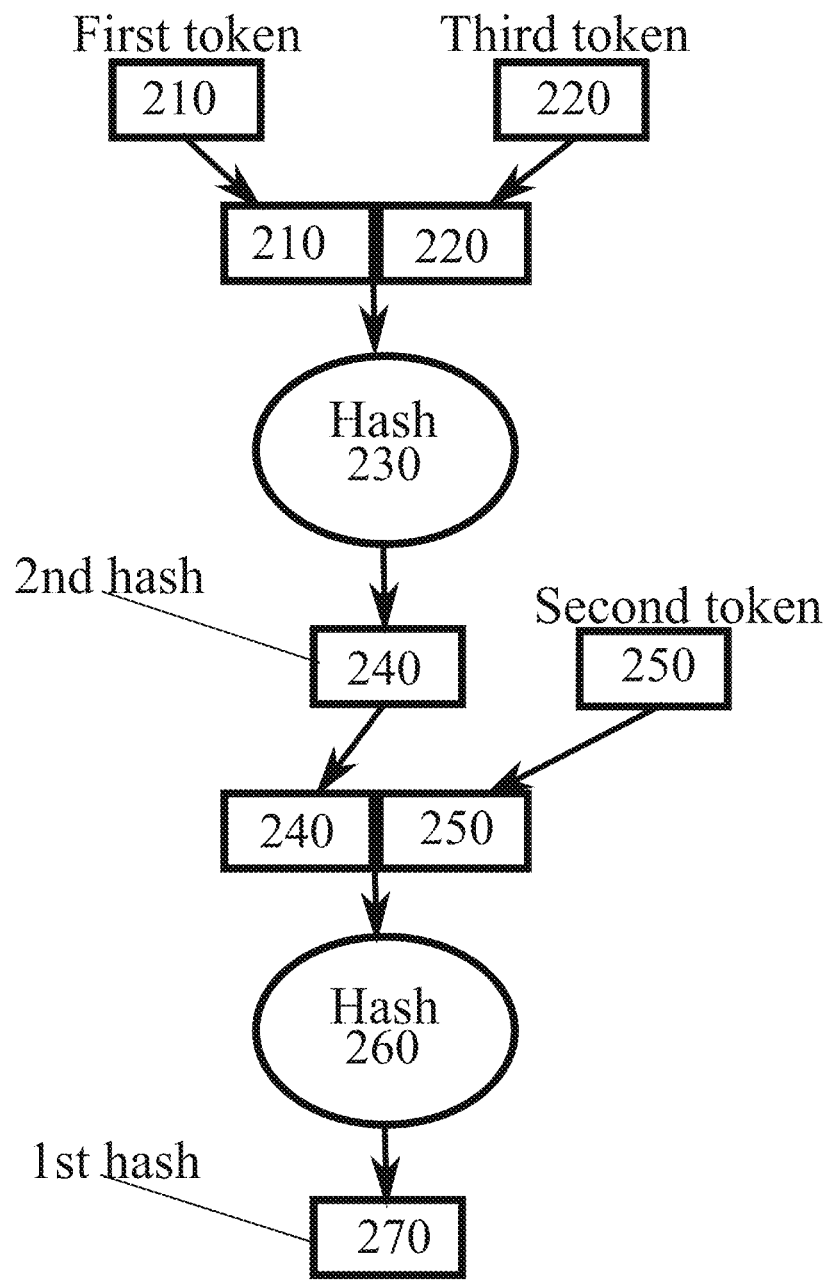
FIG. 2 illustrates derivation of the first and second hashes, in accordance with at least some embodiments of the present invention.

FIG. 2 illustrates derivation of the first and second hashes, in accordance with at least some embodiments of the present invention. First token 210 and third token 220 may initially be concatenated so as to form a data unit that can be provided as input to a hash algorithm. By concatenation it is herein broadly meant that the input to the hash algorithm is obtained from the first token and the third token. A first run of hash algorithm 230 may be performed in server 160, for example, resulting as output in second hash 240. Second hash 240 may be provided to device 110, which may concatenate it together with second token 250, to form a data unit suitable for being provided as input to a hash algorithm. Here also concatenation broadly means that the data unit is obtained from the second hash and the second token. Second run of hash algorithm 260 may take place in device 110, for example. The hash algorithm used in runs 230 and 260 need not be the same. As an output of second run 260, the first hash 270 is obtained. Therefore first hash 270 is based on the second token and, via second hash 240, on the first token and the third token as well.

Figure 3:
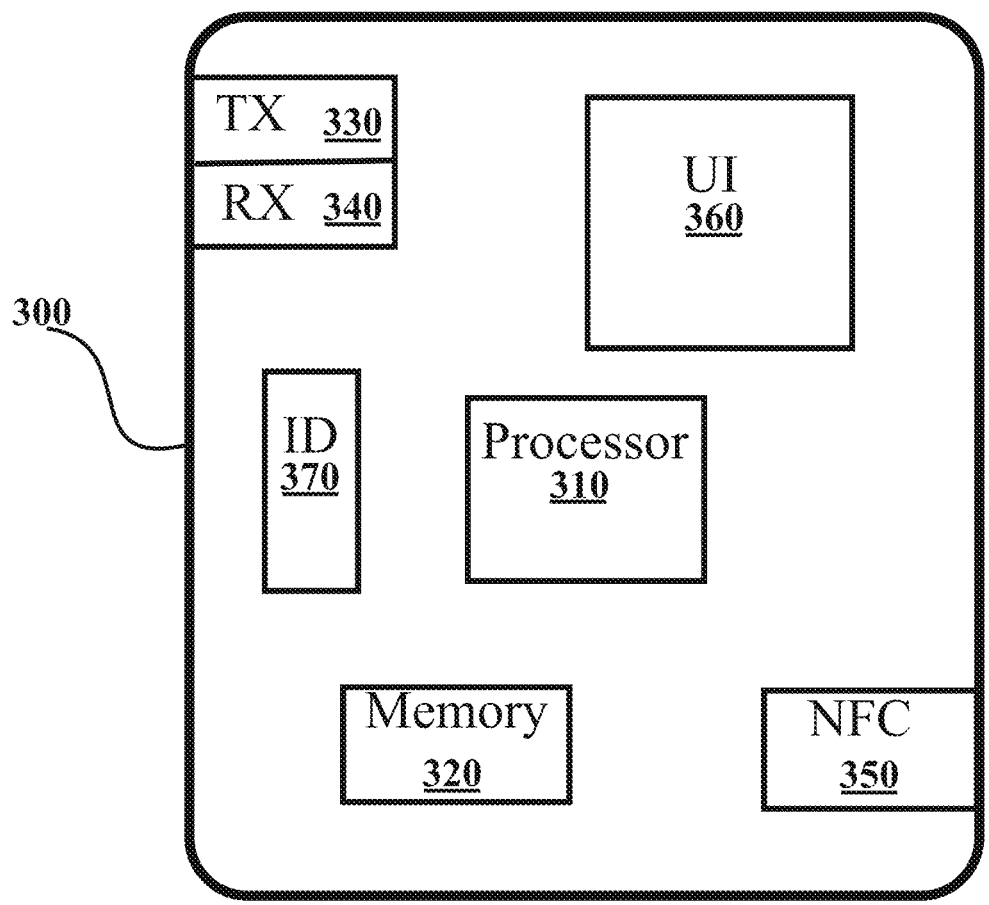
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device 110 or, in suitable respects, apparatus 120 of FIG. 1. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to request access to an apparatus, to originate telephone calls or video calls, to browse the Internet, to manage digital files stored in memory 320 or on a cloud service accessible via transmitter 330 and receiver 340, or via NFC transceiver 350, and/or to play games, for example.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
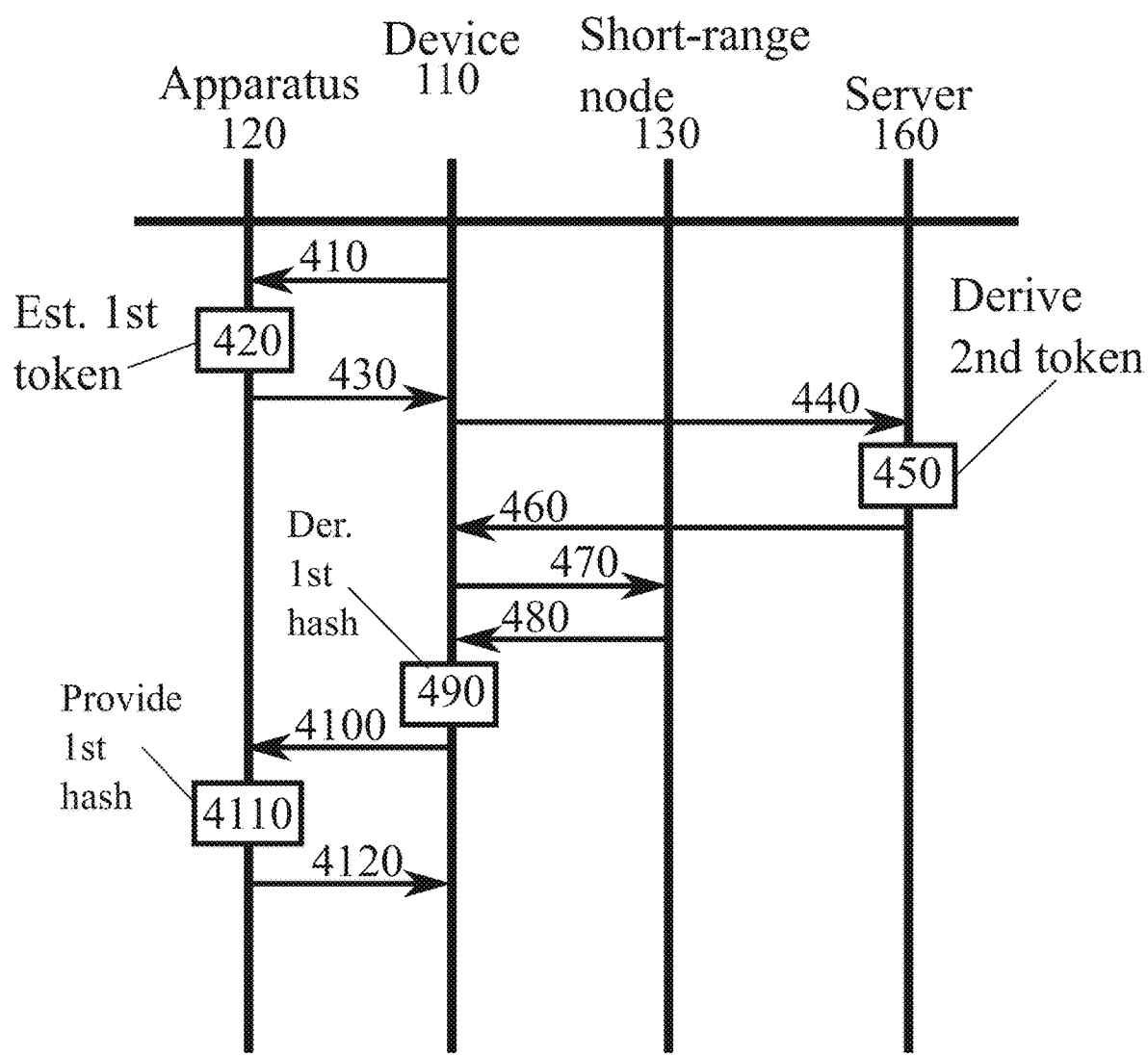
FIG. 4 illustrates signalling in accordance with at least some embodiments of the invention.

FIG. 4 illustrates signalling in accordance with at least some embodiments of the invention. On the vertical axes are disposed, in terms of FIG. 1, from left to right, apparatus 120, device 110, short-range node 130 and, finally, server 160. Time advances from the top toward the bottom.

In phase 410, device 110 transmits a request to apparatus 120 to request the first token. In phase 420, apparatus 120 establishes the first token, for example using a random or pseudo-random process, and in phase 430 apparatus 120 provides the first token to device 110. Alternatively, as described above, device 110 may establish the first token and provide it to apparatus 120.

In phase 440, device 110 provides the first token to server 160. Server 160, in phase 450, derives the second hash based, at least in part, on the first token and the third token, which server 160 already knows. In phase 460, the second hash is provided to device 110. Device 110 and server 160 may communicate with one another as described in connection with FIG. 1, for example. In phase 470 device 110 requests for the second token from short-range node 130, and short-range node, in phase 480, responsively provides the second token to device 110. The messages of phases 470 and 480 may be exchanged between device 110 and short-range node over a short-range technology, for example. A short-range technology may comprise a radio or optical technology, for example. The messages of phases 470 and 480 may be exchanged before phase 440 or after phase 440, as in FIG. 4.

In phase 490, device 110 derives the first hash, based at least in part on the second hash and on the second token, as described above. The first hash thus may be based directly on the second token and indirectly, via the second hash, on the first and third tokens.

In phase 4100, device 110 provides the first hash to apparatus 120, using a suitable communication technology. Phase 4100 may comprise a BT LE GATT characteristics write or use of HTTPS, COAP or MQTT, for example. In phase 4110, apparatus 120 verifies the first hash received in phase 4100 from device 110. In detail, apparatus 120 may derive first the second hash, using the first token and the third token, and then the first hash, using the second hash and the second token, and compare whether the resulting hash matches with the first hash received in apparatus 120 from device 110 in phase 4100. At least part of phase 4100 may precede phase 4100 in time, for example, apparatus 120 may derive the second hash and possibly also the first hash even before phase 4100.

In case the first hash provided to apparatus 120 in phase 4100 is verified as correct, apparatus 120 may provide an explicit or implicit indication of this to device 110, in phase 4120. Phase 4120 may comprise a BT LE GATT characteristics read, for example.

Figure 5:
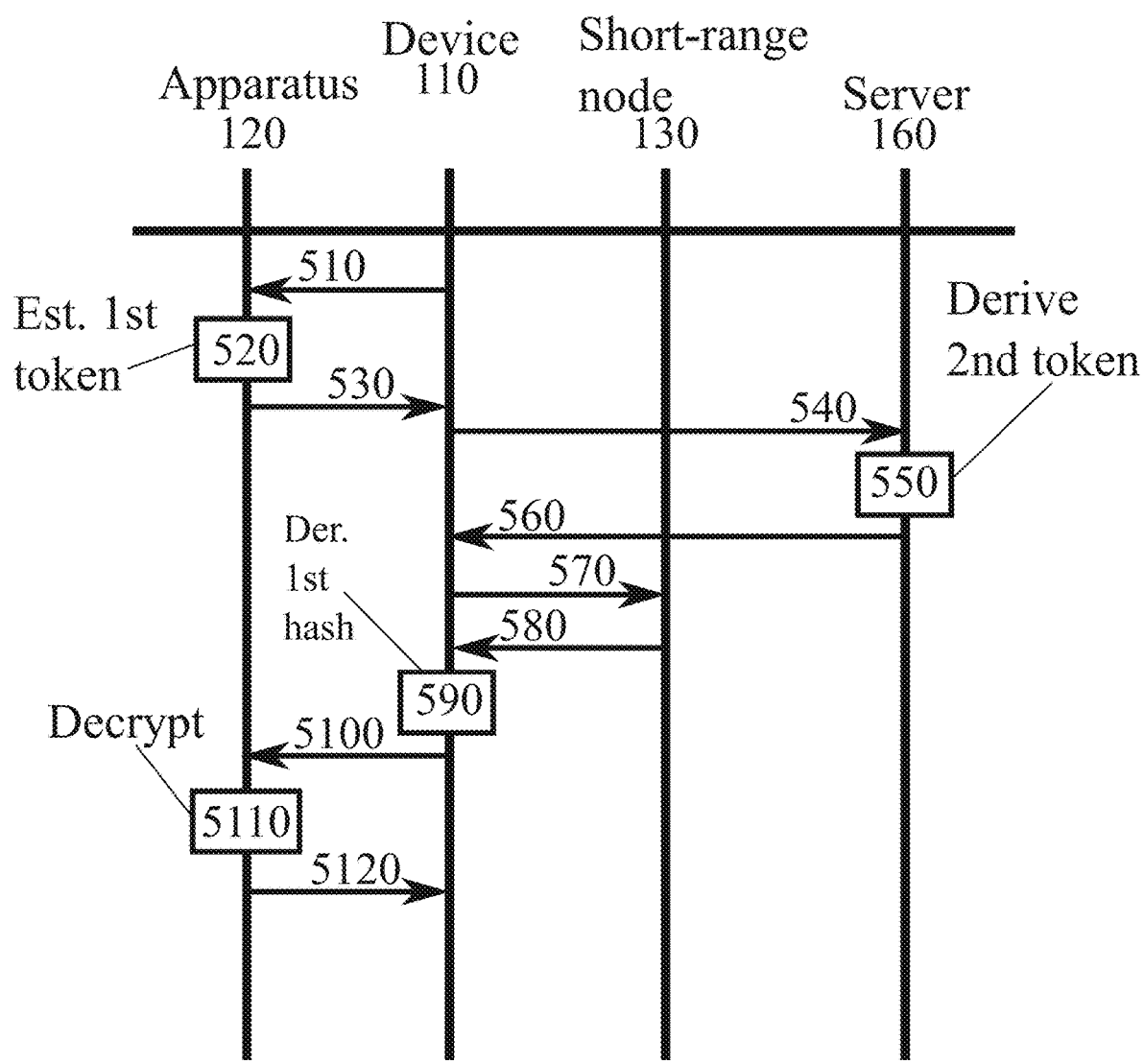
FIG. 5 illustrates signalling in accordance with at least some embodiments of the invention.

FIG. 5 illustrates signalling in accordance with at least some embodiments of the invention. The vertical axes correspond to those of FIG. 4. The process of phases 510 through 590 corresponds to the process of phases 410 through 490 of FIG. 4.

In phase 5100, device 110 communicates with apparatus 120 such that the communication is encrypted using the first hash, second hash, tokens, combination of those, or a key derived therefrom, as an encryption key, for example in a symmetric encryption process. Examples of symmetric encryption algorithms include advanced encryption standard, AES, and triple-data encryption standard, 3DES. Phase 5100 may comprise a BT LE GATT characteristics write, for example.

Phase 5110 comprises apparatus 120 decrypting the communication of phase 5100, at least in part, using as encryption key the first hash, or a key derived therefrom, which apparatus 120 has derived. Phase 5120 comprises a communication, such as, for example, a BT LE GATT characteristics read, which may again me encrypted, at least in part, using the first hash, or a key derived from the first hash.

Figure 6:
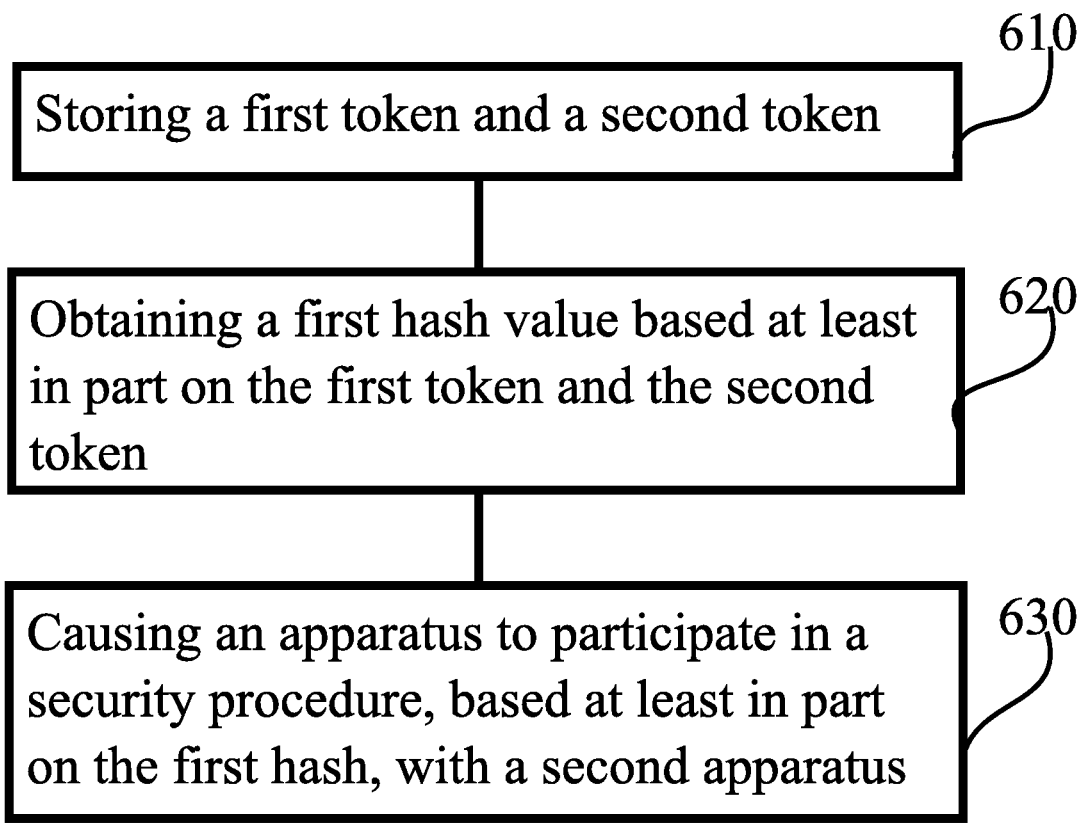
FIG. 6 is a first flow chart illustrating phases of a first method in accordance with at least some embodiments of the present invention.

FIG. 6 is a first flow chart illustrating phases of a first method in accordance with at least some embodiments of the present invention. The phases of the method illustrated in FIG. 6 may be performed in device 110 or in a control device configured to control the functioning of device 110, when implanted therein, for example.

Phase 610 comprises storing a first token and a second token. Phase 620 comprises obtaining a first hash value based at least in part on the first token and the second token. Finally, phase 630 comprises causing an apparatus to participate in a security procedure, based at least in part on the first hash, with a second apparatus.

Figure 7:
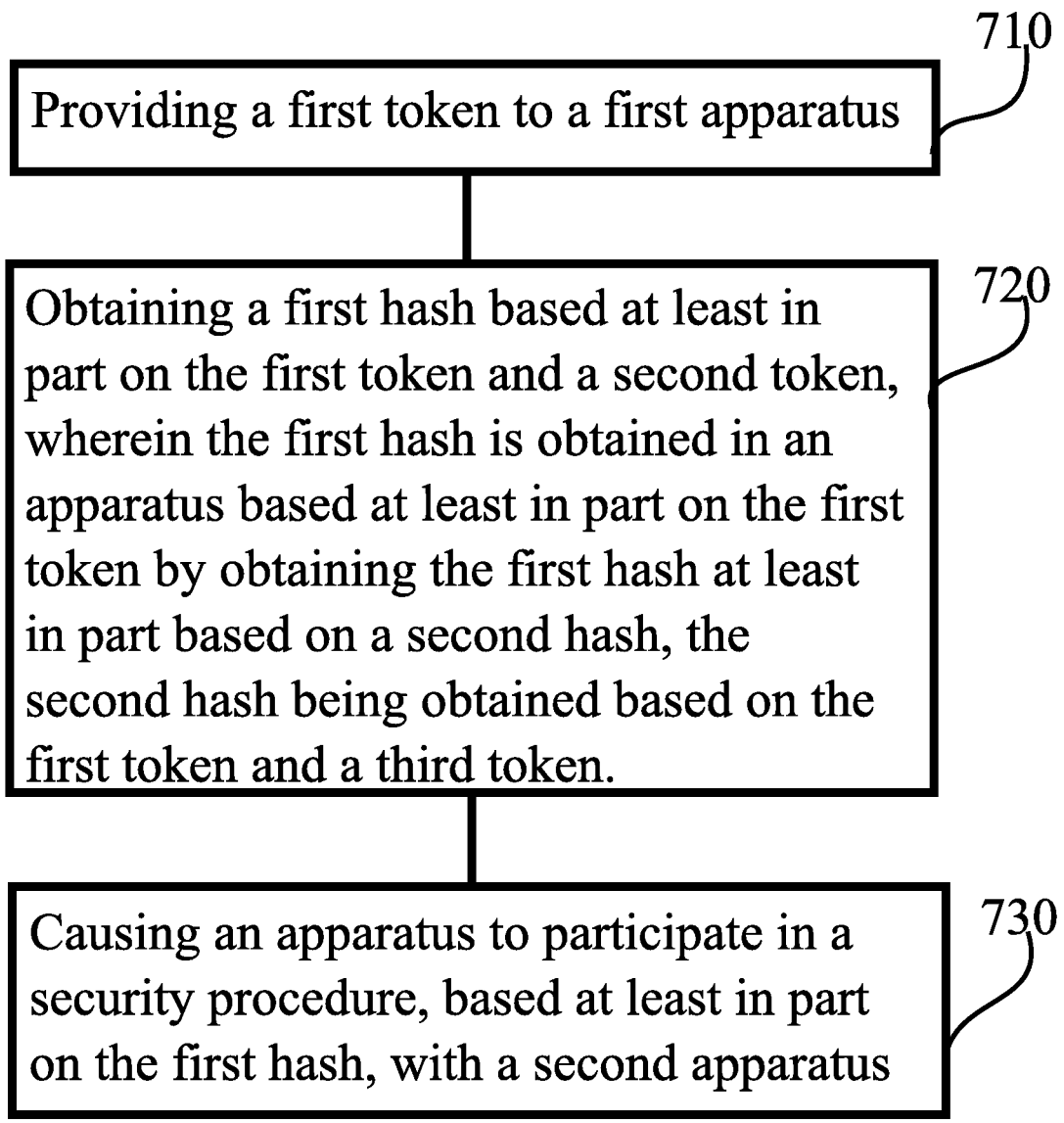
FIG. 7 is a second flow chart illustrating phases of a second method in accordance with at least some embodiments of the present invention.

FIG. 7 is a second flow chart illustrating phases of a second method in accordance with at least some embodiments of the present invention. The phases of the method illustrated in FIG. 7 may be performed in apparatus 120 or in a control device configured to control the functioning of apparatus 120, when implanted therein, for example.

Phase 710 comprises providing a first token to a first apparatus. Phase 720 comprises obtaining a first hash based at least in part on the first token and a second token, wherein the first hash is obtained in an apparatus based at least in part on the first token by obtaining the first hash based at least in part on a second hash, the second hash being obtained based on the first token and a third token. In other words, the second hash is based on the first token and the first hash is based on the second hash. Finally, phase 730 comprises participating in a security procedure, based at least in part on the first hash, with the second apparatus.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in reliable authentication between devices.

Acronyms List

3DES Triple-data encryption standard
AES Advanced encryption standard
BT LE Bluetooth low-energy
GATT Generic attribute profile
https Hypertext transfer protocol secure, HTTP over TLS
IoT Internet of Things
MD5 Message digest 5 algorithm
NFC Near-field communication
RFID Radio-frequency identification
SHA-3 Secure hash algorithm 3
SIM Subscriber identity module

REFERENCE SIGNS LIST

| | |
|---|---|
| 110 | Device of FIG. 1 |
| 120 | Apparatus of FIG. 1 |
| 130 | Short-range node of FIG. 1 |
| 140 | Access point of FIG. 1 |
| 150 | Network node of FIG. 1 |
| 160 | Server of FIG. 1 |
| 210 | First token |
| 220 | Third token |
| 230 | First run of hash algorithm |
| 240 | Second hash |
| 250 | Second token |
| 260 | Second run of hash algorithm |
| 270 | First hash |
| 300-370 | Structure of apparatus of FIG. 3 |
| 410-4120 | Phases of FIG. 4 |
| 510-5120 | Phases of FIG. 5 |
| 610-630 | Phases of FIG. 6 |
| 710-730 | Phases of FIG. 7 |

The invention claimed is:

1. A first apparatus comprising, at least one processor, and at least one memory including computer program code, the at least one memory and the computer program code configured to, with the at least one processor, cause the first apparatus at least to:
   store a first token and a second token;
   obtain, from a server, a second hash, the second hash being based on the first token and a third token, wherein the first apparatus does not know the third token when the second hash is obtained;
   derive, after the obtaining of the second hash from the server, a first hash value based at least in part on the first token and the second token by providing the second token and the second hash to a hash algorithm as input, wherein the first apparatus does not know the third token when the first hash is derived, and
   participate in a security procedure, based at least in part on the first hash value, with a second apparatus, wherein the security procedure comprises an encryption procedure, which comprises the first apparatus encrypting information using the first hash or a key derived from the first hash as an encryption key, and transmitting the encrypted information to the second apparatus for decryption in the second apparatus,
wherein the first apparatus, the second apparatus and the server are three separate devices.

2. The first apparatus according to claim 1, wherein the at least one memory and the computer program code are configured to, with the at least one processor, cause the first apparatus to cause transmission of the first token and the first hash value to the second apparatus.

3. The first apparatus according to claim 1, wherein the at least one memory and the computer program code are configured to, with the at least one processor, cause the first apparatus to obtain the second token from a short-range apparatus.

4. The first apparatus according to claim 3, wherein the short-range apparatus comprises a radio-frequency tag.

5. The first apparatus according to claim 1, wherein the at least one memory and the computer program code are configured to, with the at least one processor, cause the first apparatus to obtain the first token from the second apparatus.

6. The first apparatus according to claim 1, wherein the security procedure comprises an authentication procedure, which comprises the first apparatus transmitting the first hash value to the second apparatus.

7. A method comprising:
- storing a first token and a second token in a first apparatus;
- obtaining, from a server, a second hash, the second hash being based on the first token and a third token, wherein the first apparatus does not know the third token when the second hash is obtained;
- deriving, after the obtaining of the second hash from the server, a first hash value based at least in part on the first token and the second token by providing the second token and the second hash to a hash algorithm as input, wherein the first apparatus does not know the third token when the first hash value is derived, and
- participating in a security procedure, based at least in part on the first hash value, with a second apparatus, wherein the security procedure comprises an encryption procedure, which comprises the first apparatus encrypting information using the first hash or a key derived from the first hash as an encryption key, and transmitting the encrypted information to the second apparatus for decryption in the second apparatus, wherein the first apparatus, the second apparatus and the server are three separate devices.

8. The method according to claim 7, further comprising causing a transmitter to cause transmission of the first token and the first hash value to the second apparatus.

9. The method according to claim 7, further comprising obtaining the second token from a short-range apparatus.

10. The method according to claim 9, wherein the short-range apparatus comprises a radio-frequency tag.

11. The method according to claim 7, further comprising obtaining the first token from the second apparatus.

12. A non-transitory computer readable medium having stored thereon a set of computer readable instructions that, when executed by at least one processor, cause a first apparatus to at least:
- store a first token and a second token;
- obtain, from a server, a second hash, the second hash being based on the first token and a third token, wherein the first apparatus does not know the third token when the second hash is obtained;
- derive, after the obtaining of the second hash from the server, a first hash value based at least in part on the first token and the second token by providing the second token and the second hash to a hash algorithm as input, wherein the first apparatus does not know the third token when the first hash value is derived, and
- participate in a security procedure, based at least in part on the first hash value, with a second apparatus, wherein the security procedure comprises an encryption procedure, which comprises the first apparatus encrypting information using the first hash or a key derived from the first hash as an encryption key, and transmitting the encrypted information to the second apparatus for decryption in the second apparatus, wherein the first apparatus, the second apparatus and the server are three separate devices.

* * * * *